United States Patent [19]
Havig

[11] Patent Number: 5,979,588
[45] Date of Patent: Nov. 9, 1999

[54] METHOD AND APPARATUS FOR INSTALLING ELECTRONIC EQUIPMENT BELOW SOFT EARTH SURFACE LAYER

[75] Inventor: Sven O. Havig, Houston, Tex.

[73] Assignee: Petroleum Geo-Services, Inc., Houston, Tex.

[21] Appl. No.: 08/889,391

[22] Filed: Jul. 8, 1997

Related U.S. Application Data

[62] Division of application No. 08/544,734, Oct. 18, 1995, abandoned.

[30] Foreign Application Priority Data

May 24, 1995 [NO] Norway ..................................... 95-2072

[51] Int. Cl.⁶ ....................................................... G01V 1/40
[52] U.S. Cl. ........................... 181/102; 367/178; 367/188
[58] Field of Search ..................................... 181/102, 103, 181/104, 105; 367/25, 33, 34, 35, 178, 188; 73/654

[56] References Cited

U.S. PATENT DOCUMENTS

| | | | |
|---|---|---|---|
| 4,248,098 | 2/1981 | Sawayama et al. . | |
| 4,438,820 | 3/1984 | Gibson . | |
| 4,775,009 | 10/1988 | Wittrisch et al. . | |
| 4,905,517 | 3/1990 | Crowe et al. | 73/654 |
| 5,060,737 | 10/1991 | Mohn . | |
| 5,080,190 | 1/1992 | Owen et al. . | |
| 5,092,423 | 3/1992 | Petermann . | |
| 5,119,098 | 6/1992 | Khalil . | |
| 5,130,950 | 7/1992 | Orban et al. . | |
| 5,206,840 | 4/1993 | Cobbs et al. . | |
| 5,243,562 | 9/1993 | Laurent et al. . | |
| 5,363,094 | 11/1994 | Staron et al. . | |
| 5,413,174 | 5/1995 | Schmidt . | |
| 5,429,190 | 7/1995 | Kilgore et al. . | |
| 5,467,823 | 11/1995 | Babour et al. . | |
| 5,524,709 | 6/1996 | Withers . | |
| 5,537,364 | 7/1996 | Howlett . | |

*Primary Examiner*—Khanh Dang
*Attorney, Agent, or Firm*—Gordon T. Arnold; Arnold & Associates

[57] ABSTRACT

A method for monitoring production mineral reservoirs, the method comprising: permanently installing a geophone in a borehole; generating a first set of seismic waves; receiving a first set of seismic data with the geophone; recording the first set of data of said receiving a first set of seismic data; generating a second set of seismic waves after sufficient time has passed for conditions in the reservoir to have changed from the generating a first set of seismic waves; receiving a second set of seismic data with the geophone; and recording the second set of seismic data of said receiving a second set of seismic data. A method for installing instruments below the surface of the earth, the method comprising: drilling a borehole with a drill apparatus; inserting an instrument in the borehole; and permanently fixing the instrument in the borehole. An instrument for receiving seismic data, the instrument comprising: a geophone component which operates in an X-direction; a geophone component which operates in an Y-direction; a geophone component which operates in an Z-direction; and a housing for the geophone components which is permanently fixed in a borehole.

7 Claims, 11 Drawing Sheets

METHOD AND APPARATUS FOR INSTALLING ELECTRONIC EQUIPMENT BELOW SOFT EARTH SURFACE LAYER

This application is a division of application number 08/544,734, filed Oct. 18, 1995, now abandoned.

FIELD OF THE INVENTION

This invention relates to vertical geological information gathering methods and apparatuses for the purpose of monitoring mineral production and exploration.

BACKGROUND OF THE INVENTION

As the value of oil and gas has continued to rise, there has been increasing interest in methods for effectively retrieving all minerals from known mineral deposits and for discovering new reservoirs. Information about the rate of depletion and the migration of minerals within a mineral reservoir allow operators to apply the most effective production techniques to the particular reservoir conditions. Accurate monitoring of mineral depletion from a given reservoir requires replication of accurate surveys over a long period of time. Also, because differently placed and coupled receivers provide altered results, the seismic receivers need to be placed and coupled similarly for surveys conducted at different times.

One example of an earlier method entails drilling a production borehole, inserting a three-dimensional geophone instrument for data collection, and removing the instrument for mineral production from the borehole. A three-directional geophone is capable of detecting P waves and S waves. This allows for interpretation of: lithography, porosity, pore fluid type, pore shape, depth of burial consolidation, anisotropic changes in pressure, and anisotropic changes in temperature. However, if subsequent readings are to be obtained, production must cease and the instrument must be reinserted into the borehole. The position and coupling of the geophone receiver will not be the same as before and will, therefore, produce skewed data from that initially taken. Thus, even though this method detects both S and P waves, it is difficult to compare subsequent surveys because of different geophone positioning and coupling.

A second example of an earlier method comprises deploying geophones at various locations on the surface and taking readings. Once the survey is completed, the receivers are retrieved for subsequent use at another survey project. In an ocean survey, the water and mud layer typically kill the S waves so that they do not propagate up into the mud or water where they could be received by seismic instruments positioned there. This is also true for the soft earth surface layer of land surveys. Thus, the data collected at the surface is not as accurate as data collected from deep within a borehole. Also, like the previous method, if survey data is to be collected at a later time, the receivers must be re-deployed upon the surface. Again, the receivers are not likely to be positioned and coupled as in the first survey.

Therefore, in order to provide accurate surveys of reservoirs over time, there is a need for repeatability in the location of seismic receivers and in detection of both S-wave and P-wave signals.

SUMMARY OF THE INVENTION

According to one aspect of the invention, there is provided a method for monitoring production mineral reservoirs. One embodiment of this aspect comprises: permanently installing a geophone in a borehole; generating a first set of seismic waves; receiving a first set of seismic data with the geophone; recording the first set of data of said receiving a first set of seismic data; generating a second set of seismic waves after sufficient time has passed for conditions in the reservoir to have changed from the generating a first set of seismic waves; receiving a second set of seismic data with the geophone; and recording the second set of seismic data of said receiving a second set of seismic data.

According to another aspect of the invention, there is provided a method for installing instruments below the surface of the earth. One embodiment of this aspect comprises: drilling a borehole with a drill apparatus; inserting an instrument in the borehole; and permanently fixing the instrument in the borehole.

According to a further aspect of the invention, there is provided an instrument for receiving seismic data. One embodiment of the aspect comprises: a geophone component which operates in an X-direction; a geophone component which operates in an Y-direction; a geophone component which operates in an Z-direction; and a housing for the geophone components which is permanently fixed in a borehole.

According to a further aspect of the invention, there is provided a system for collecting seismic information. One embodiment of this aspect comprises: a signal source; a signal receiver permanently fixed in a borehole; a control unit that sends and receives information to and from the signal source and the signal receiver; and communicators of data between the control unit and the signal receiver and the signal source.

According to a still further aspect of the invention, there is provided a method for monitoring production mineral reservoirs. One embodiment comprises: installing a pipe permanently in a borehole; lowering in a first instance an electronic instrument into the pipe; reading a first set of data with the electronic instrument; removing the electronic instrument from the pipe; lowering in a second instance the electronic instrument into the pipe after sufficient time has passed for conditions in the reservoir to have changed; and reading a second set of data with the electronic instrument.

BRIEF DESCRIPTION OF THE DRAWING

The present invention is better understood by reading the following description of nonlimitative embodiments with reference to the attached drawings, wherein like parts in each of the several figures are identified by the same reference character, which are briefly described as follows.

It is to be noted, however, that the appended drawings illustrate only typical embodiments of the invention and are therefore not to be considered a limitation of the scope of the invention which includes other equally effective embodiments.

DETAILED DESCRIPTION OF THE INVENTION

Figure 1:
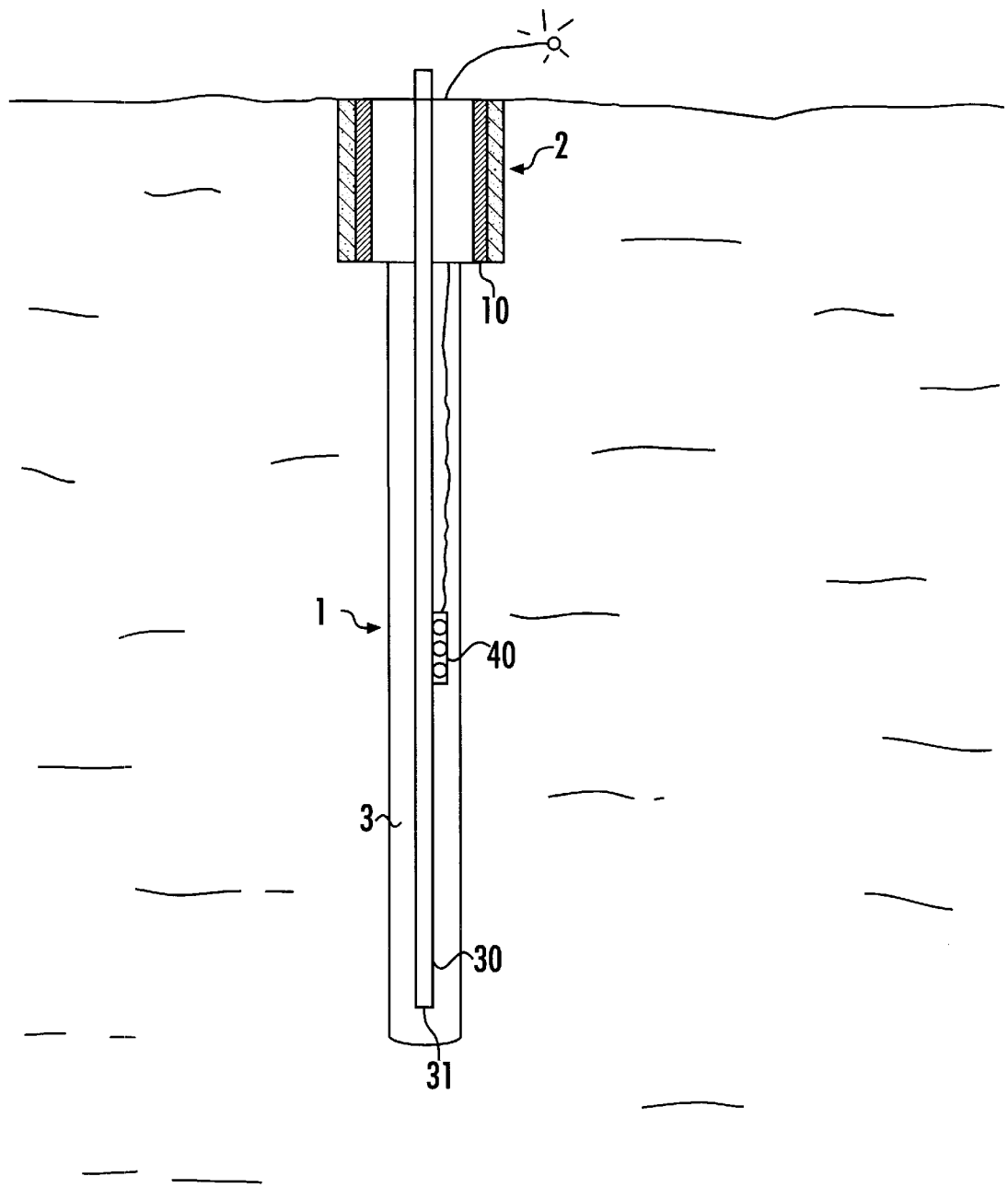
FIG. 1 is a cross-sectional view of an instrument in a vertical borehole.
Figure 2:
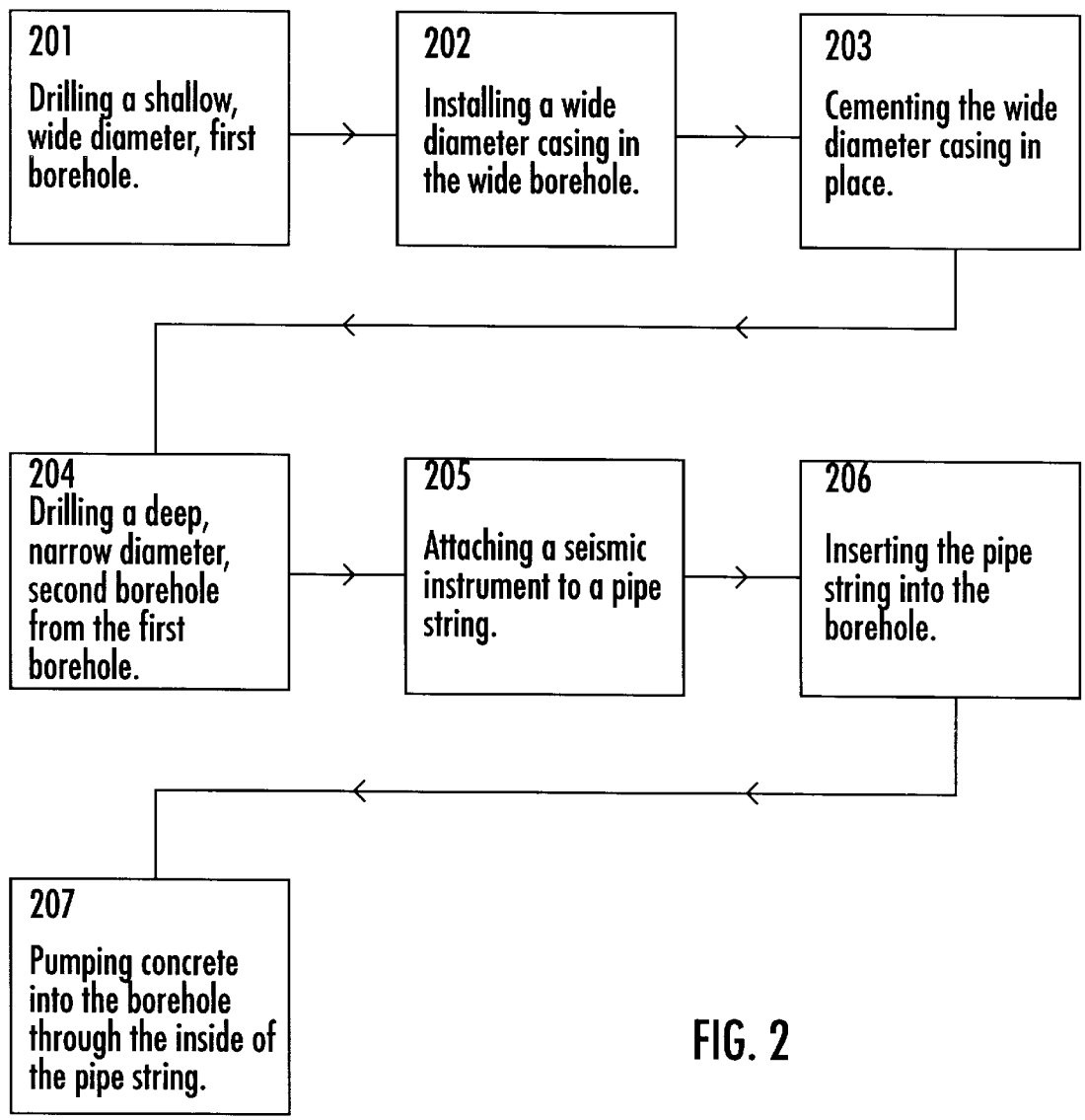
FIG. 2 is an outline of a method for installing an instrument in a vertical borehole.

Referring to FIGS. 1 and 2, there is shown a cross-sectional view of a vertical seismic instrument well (1) and an outline of a method for installing the instrument. The method comprises drilling (201) a first section (2) of the well to a depth of about 50 feet. This first section (2) is relatively wider than deeper second section (3) of the well yet to be drilled. A larger diameter casing (10) (for example, 3.5 to 4.5 inches) is installed (202) in this first section (2). The space between the casing (10) and the earth is filled (203) with cement to permanently fix the casing (10) in position. A smaller diameter section (3) (for example, about 2.4 inches) is then drilled (204) below the larger diameter casing (10) to a depth of about 700 to 1000 feet (this depth could be much deeper given the particular environment surrounding the borehole). A seismic instrument (40) is then attached (205) to a pipe (30) and the pipe is inserted (206) into the well (1). The end of the pipe (30) extends nearly to the bottom of the well (1) and the instrument (40) is attached to the pipe (30) at a depth of about 300 to 400 feet (this depth may be changed according to the desired instrument configuration). Cement is then pumped (207) into the pipe (30) so that it flows down the pipe (30) and out a hole (31) at the bottom. The concrete first fills the space between the pipe (30) and the smaller diameter section (3) and encircles the instruments (40). Finally, the concrete fills the space between the pipe (30) and the larger diameter casing (10). Once the concrete sets, the instrument (40) is permanently fixed in the well (1). Instruments may be installed in this way both on land and offshore.

In some environments, the instruments may be fixed in the borehole by allowing the borehole walls to collapse on the instrument. At times this will provide superior coupling of the instrument to the surrounding formation because of the uniformity of material around the instrument.

As the cost of the drilling apparatuses become less expensive, it will be more efficient to attach the seismic instrument directly to the coil tube itself. The coil tube is then left in the borehole while the instruments are permanently fixed in the borehole. Concrete is pumped into the borehole through the coil tube so as to flow up and around the instruments as before. The drill bit and downhole motor are then permanently fixed in the borehole as well as the instruments. This method is preferred when it is less expensive to leave the drill apparatuses in the borehole rather than pull them out. A high pressure water nozzle is one type of drilling apparatus that may eventually become so inexpensive to merit leaving in the borehole.

Figure 3:
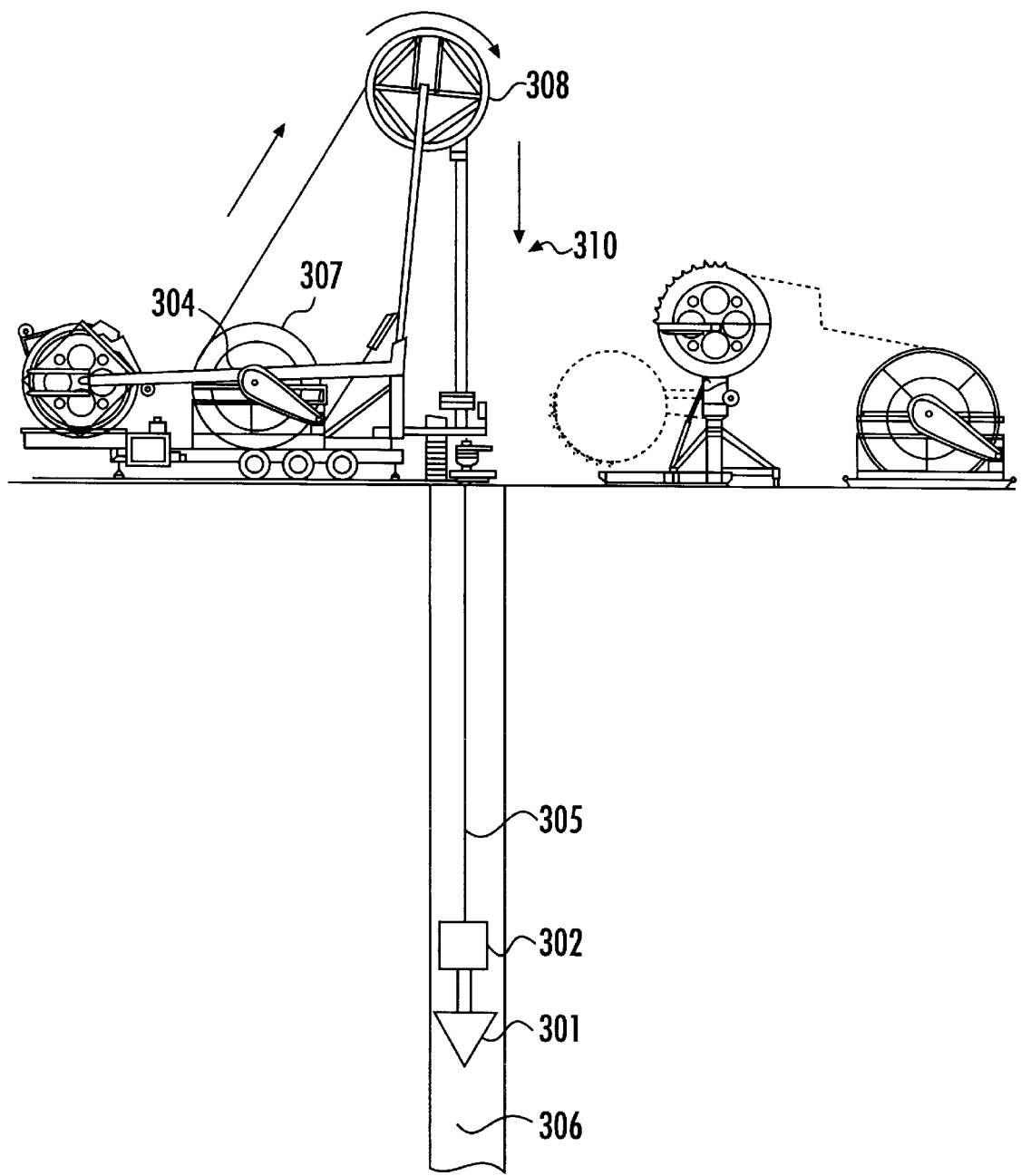
FIG. 3 is a cross-sectional view of a coil tube drilling apparatus.

Referring to FIG. 3, a coil tube drilling apparatus (310) is shown. The drill bit (301) is driven by a downhole motor (302). The downhole motor (302) is powered by mud pump pressure which is pumped by a pump (304) at the surface. A coil tube (305) connects the pump (304) to the downhole motor (302). As the borehole (306) is drilled deeper, the coil tube (305) is reeled off a tube spool (307) and over a wheel (308). The wheel (308) is positioned over the borehole (306) so that the coil tube (305) may extend from the wheel (308) and down into the borehole (306).

One example of the coil tube drilling apparatus (310) is the Fleet Model 40-20 Coiled Tubing Unit produced by Vita International, Inc. This unit has the following characteristics:

Injector Head Rating: Up to 40,000 lb.

Drive: Hydrostatic powered planetary to sprocket & chain final drive.

Speed: 220 Ft. Max.

Braking System: Main brake—Fail-safe wet type, Auxiliary brake—Band type-air actuated.

Straightener: Manual/hydraulic system.

Gripping System: Lebus grooving with multiple hold-down rollers.

Size Range: To 3½".

Truck, trailer, skid mounted.

Hydraulic leveling and centering.

Mast: Up to 30 Ft. for wellhead clearance with capability for self-loading/unloading of storage/work reel.

Optional Equipment: Winches, pumps, etc. per customer requirements.

Power Equipment: Up to 200 HP Diesel.

Hydraulics: Injector and Storage/Work Reels—Sunstrand Hydrostatic, Max Pressure—5000 PSI.

Leveling, raising, winding and lateral positioning: Conventional gear type pump with max pressure—3000 PSI.

| Storage/Work Reel | | |
|---|---|---|
| Flange Dia: 120" Tubing O.D. | Core Diameter | Capacity |
| 2⅜" | 96" | 3,000 Ft. |
| 2" | 80" | 7,000 Ft. |
| 1¾" | 72" | 9,600 Ft. |
| 1½" | 72" | 14,000 Ft. |
| 1¼" | 72" | 19,000 Ft. |
| 1" | 72" | 30,000 Ft. |

Tubing Reel Cradle: Side frames are hydraulically opened to facilitate easy change out of reels.

Controls:
  A. Electric over hydraulic for injector reel; storage reel and traverse (winding).
  B. Conventional for raising, leveling, centering, winches, etc.
  Available installed in control cabin mounted on truck or trailer. Item A is available with 50' remote capability.

Figure 4A:
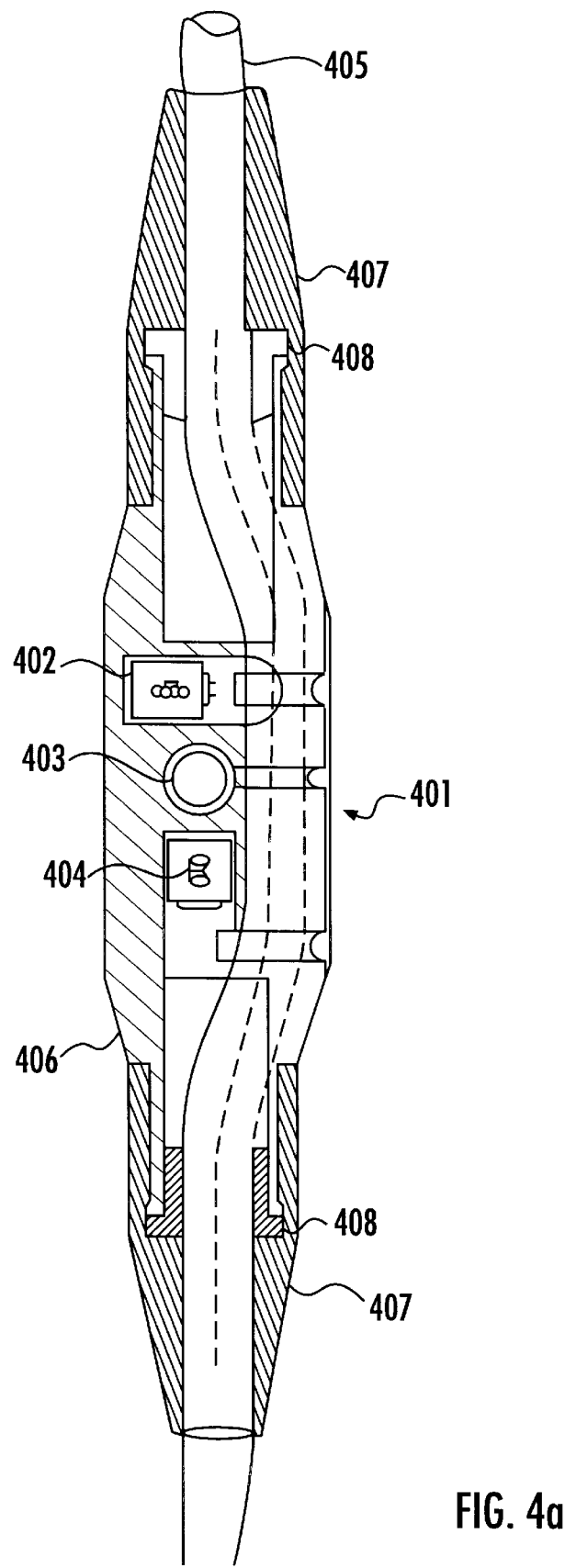
FIG. 4a is a cross-sectional view of a seismic instrument for use in a vertical borehole.

Referring to FIG. 4a, there is a seismic instrument (401) for permanent fixation in a borehole as seen along a Y axis. The instrument (401) comprises three geophones: a X-geophone (402) positioned to read waves along an X axis, a Y-geophone (403) positioned to read waves along a Y axis, and a Z-geophone (404) positioned to read waves along a Z axis. A cable (405) runs through the instrument (401) for transmission of readings received by the geophones. The instrument (401) also has a water-tight housing structure (406) that seals the cable (405) and the geophones (402), (403) and (404) within. The cable (405) is itself sealed on the portions which extend out from the housing (406). The portions of the cable (405) in the interior of the housing (406) are at connection points which connect to the geophones. Thus, in order to maintain a water-tight barrier for the entire instrument (401), seals (407) are formed between the cable (405) and the housing (406) where the cable (405) enters the housing (406) at both ends. Interior seals (408) also form a water-tight barrier between the housing (406) and the cable (405). The cable (405) and housing (406) may be sealed with either glass, epoxy or O-rings depending on the particular application.

Other types of instruments are also possible. These include: a temperature instrument, a pressure instrument, a hydrophone, a gravimetry resistance instrument, a resistivity instrument, an electromagnetic instrument, and a radiation sensing instrument.

Figure 4B:
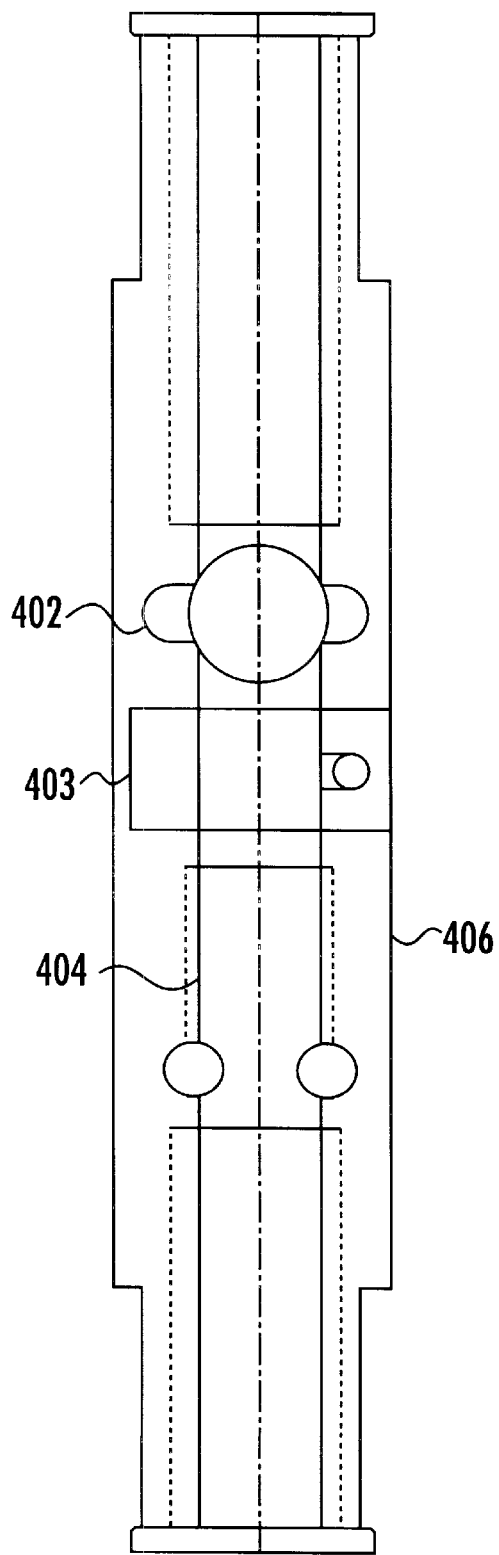
FIG. 4b is a cross-sectional view of a seismic instrument for use in a vertical borehole.
Figure 4C:
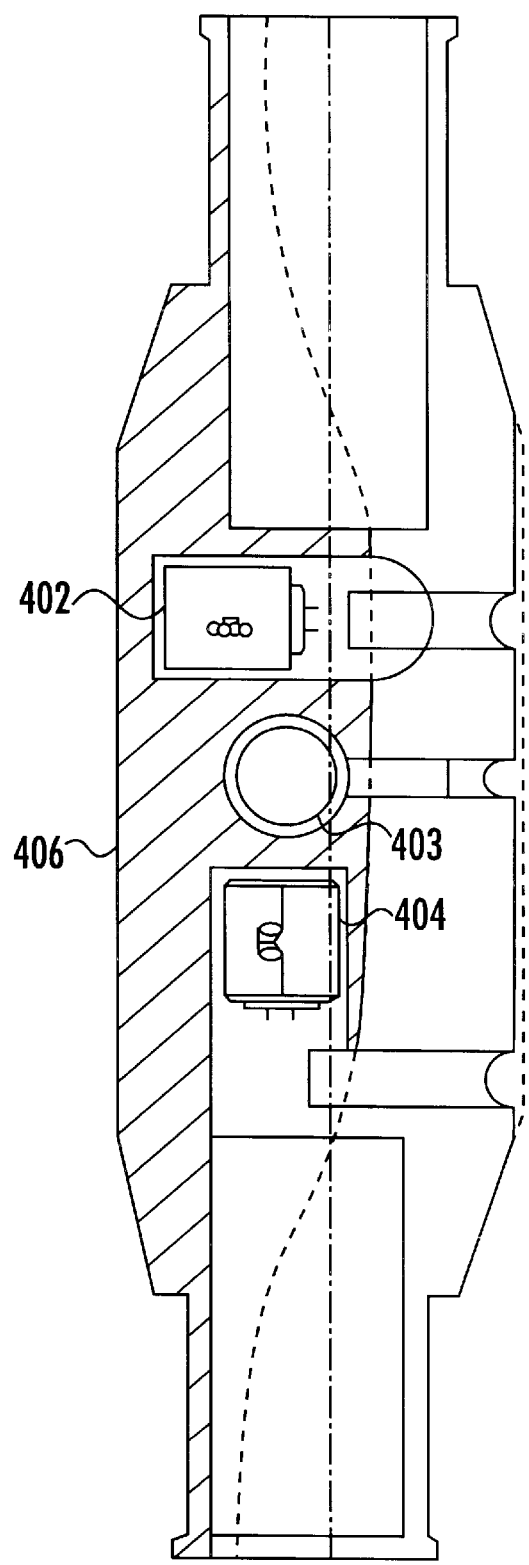
FIG. 4c is a cross-sectional view of a seismic instrument for use in a vertical borehole.
Figure 4D:
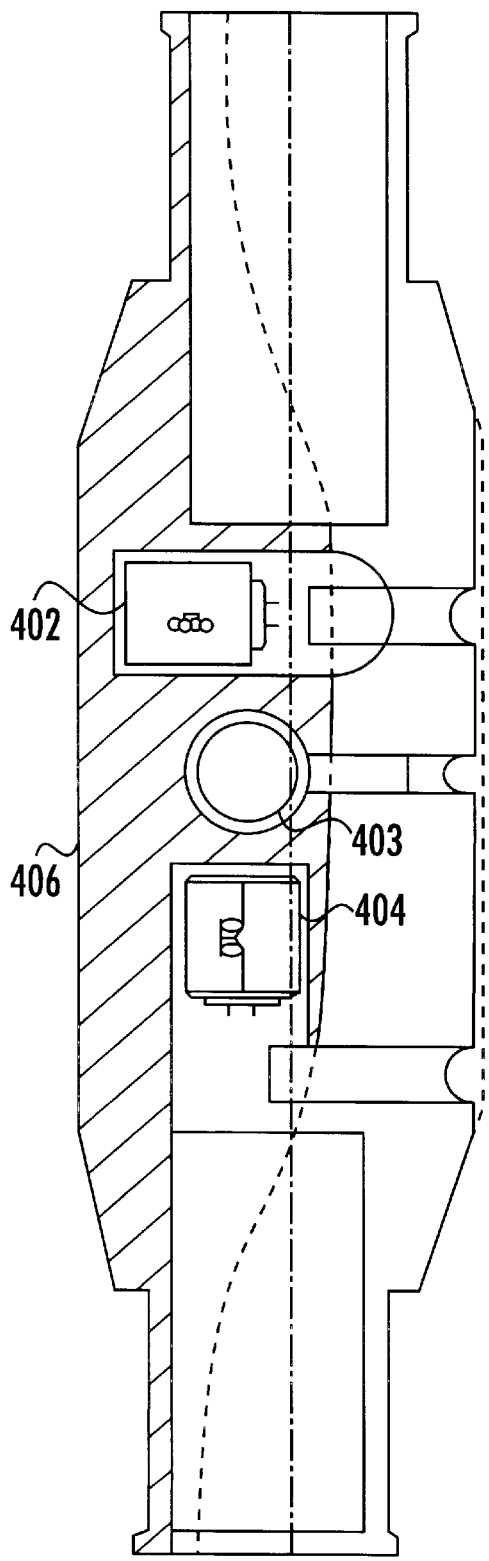
FIG. 4d is a cross-sectional view of a seismic instrument for use in a vertical borehole.
Figure 4E:
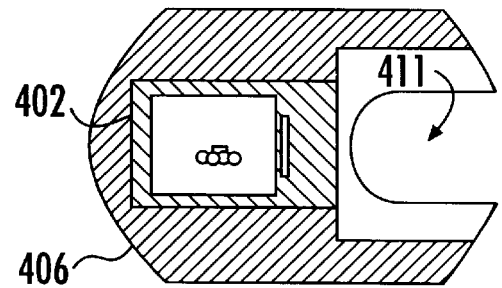
FIG. 4e is a cross-sectional view in the Z axis direction of the instrument at the X-geophone.
Figure 4F:
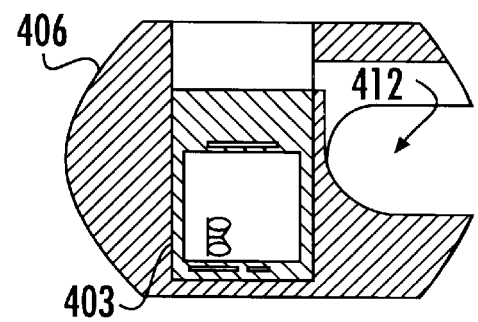
FIG. 4f is a cross-sectional view in the Z axis direction of the instrument at the Y-geophone.
Figure 4G:
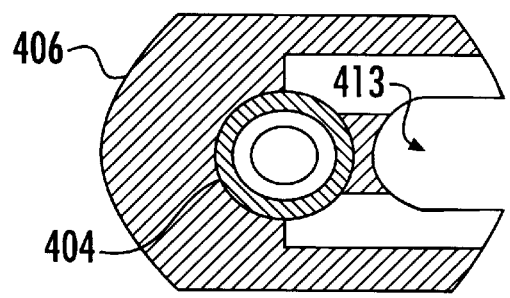
FIG. 4g is a cross-sectional view in the Z axis direction of the instrument at the Z-geophone.

Referring to FIG. 4b, there is depicted the housing (405) and the geophones (402), (403) and (404) as viewed along an X axis. Referring to FIG. 4c, the housing (405) and geophones (402), (403) and (404) are shown as viewed along a Y axis. Referring to FIG. 4d, the housing (405) and geophones (402), (403) and (404) are shown as viewed along a Y axis. In FIG. 4e, a cross section of the X-geophone (402) is shown as viewed along the Z axis. In FIG. 4f, the Y-geophone (403) is shown as viewed along the Z axis. In FIG. 4g, the Z-geophone (404) is shown as viewed along the Z axis. Notice also in FIGS. 4e–4g there are holes (411), (412) and (413) in the housing (406). The cable (405) passes through and connects to each geophone in these holes.

Figure 5:
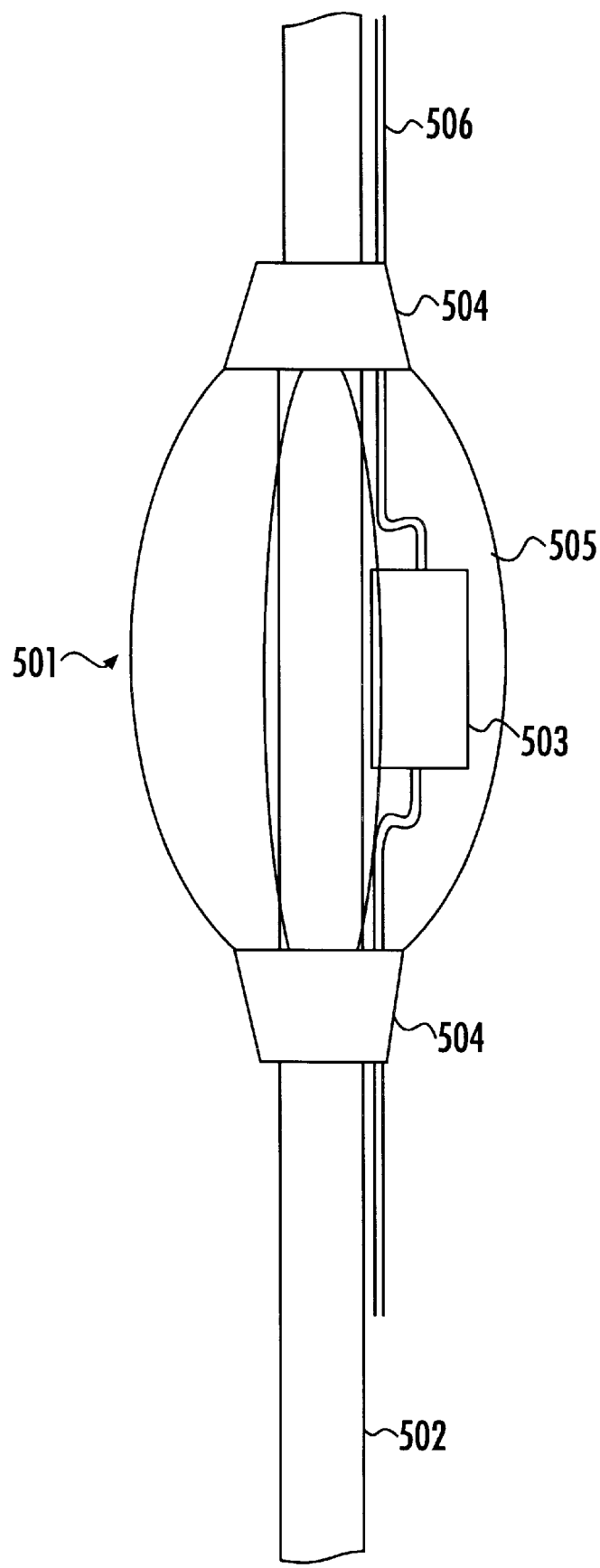
FIG. 5 is a diagram of a configuration of the instrument attached to a pipe for insertion in the borehole.

Referring to FIG. 5, a configuration for attaching the instrument to the pipe is shown. In this configuration, a centralizer (501) is fixed to the pipe (502) which is used to insert the instrument (503). The centralizer comprises upper and lower collars (504) and bows (505) which extend between and connect the collars (504). The bows (505) are somewhat flexible and have a wider outside diameter than the collars (504) so that they can flex against the sides of the borehole to prevent the pipe from contacting the sides of the borehole. A cable (506) extends from both ends of the instrument (503) and is attached to the pipe (502) by the upper and lower collars (504). Additionally, the instrument (503) can be attached to the pipe (502) by wrapping waterproof tape around both the instrument (503) and the pipe (502).

Figure 6:
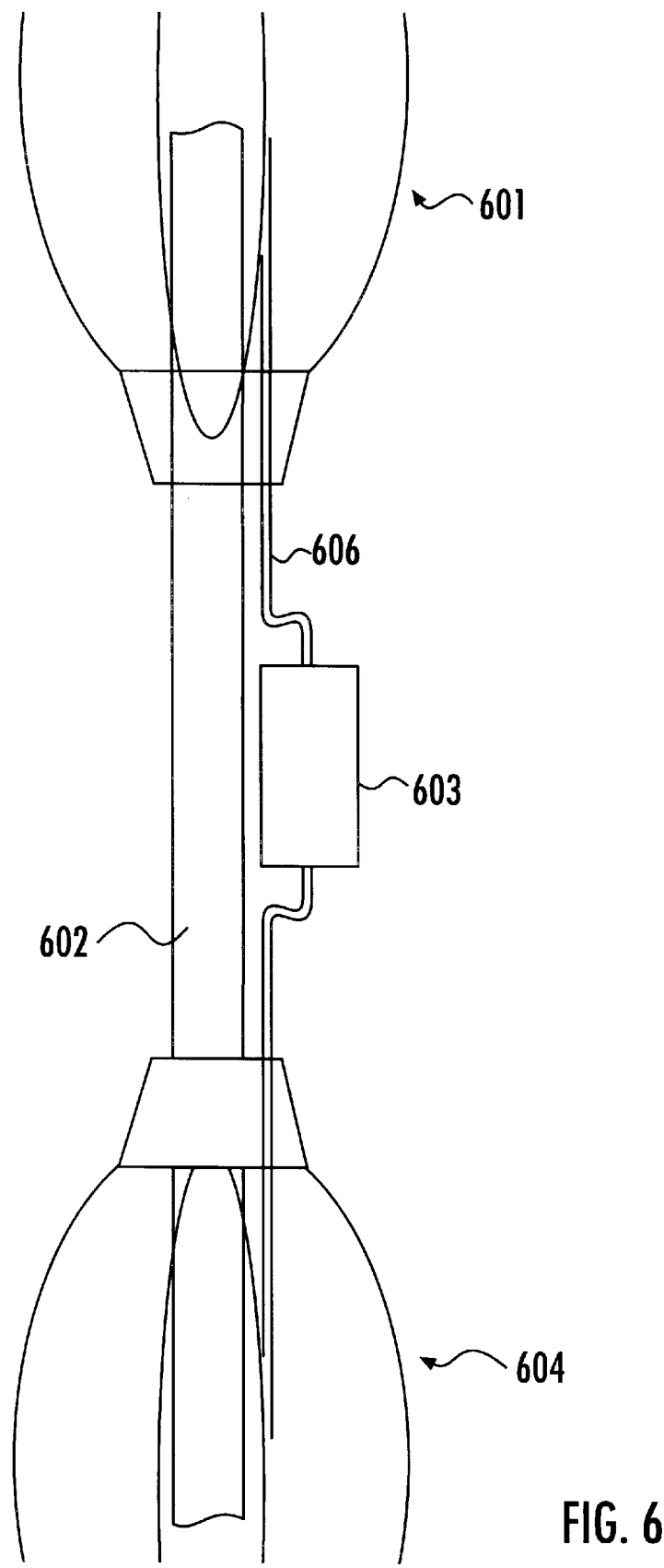
FIG. 6 is a diagram of a configuration of the instrument attached to a pipe for insertion in the borehole.

Referring to FIG. 6, a configuration for attaching the instrument to the pipe is shown. In this configuration, two centralizers (601) and (604) attach the cable (606) to the pipe (602). Here, no centralizer encircles the instrument, but rather one centralizer is above (601) the instrument and the other below (604). Again, the instrument (603) can be attached to the pipe (602) by wrapping waterproof tape around both the instrument (603) and the pipe (602).

Also, it should be understood that multiple instruments may be attached to a single pipe at various locations. Multiple centralizers may also be attached at various locations to keep the pipe from contacting the borehole sides. A centralizer could be attached every 10 feet, even where no instruments are attached.

Figure 7:
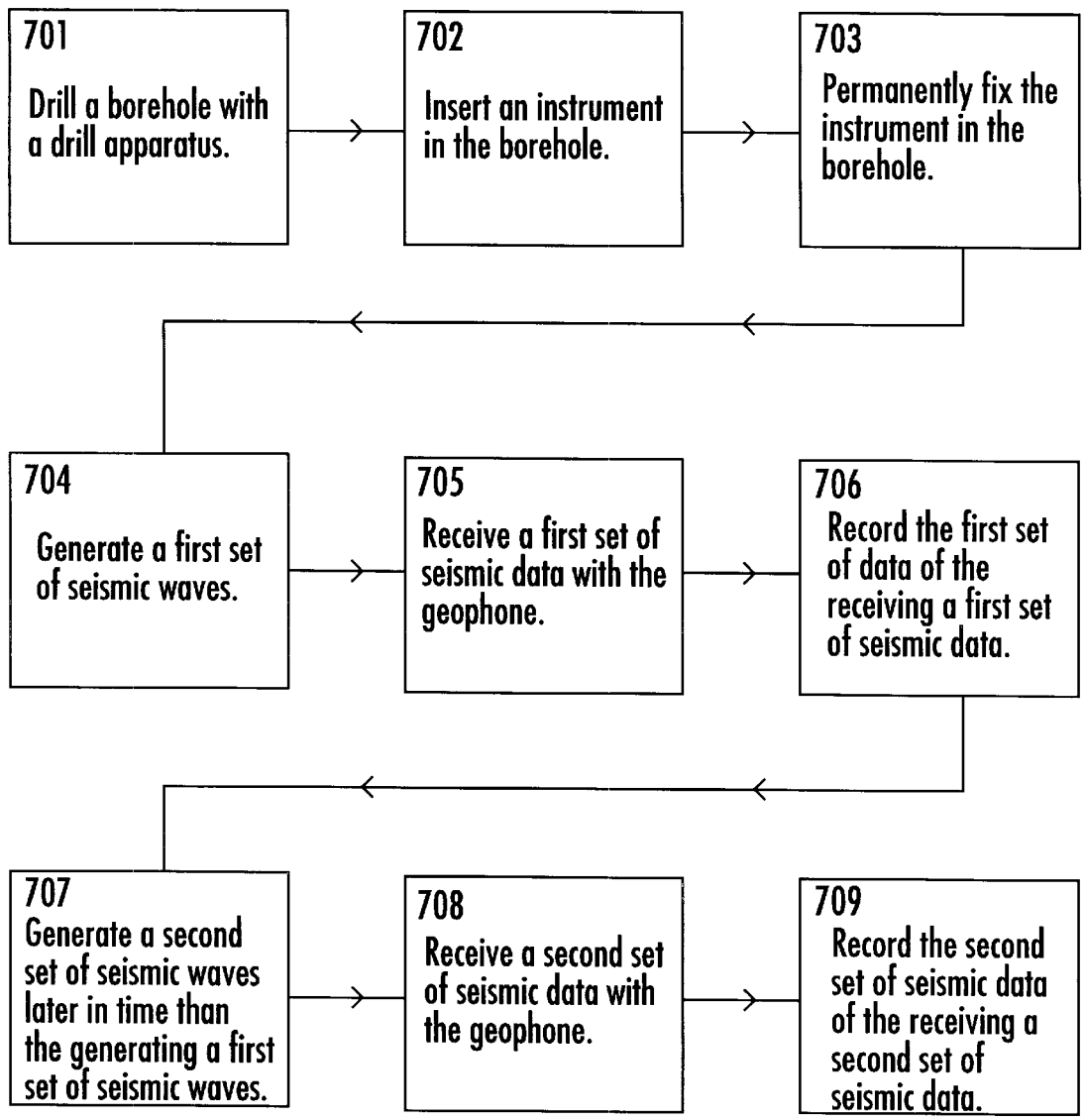
FIG. 7 is an outline of a method for monitoring a production reservoir.

Referring to FIG. 7, there is shown a method for monitoring a production mineral reservoir. The method is to install a seismic instrument permanently in the substrata near the reservoir to be monitored. This is done by drilling (701) a borehole with a drill apparatus. Next, a seismic instrument, such as a three-dimensional geophone, is inserted (702) into the borehole. The instrument is then permanently fixed (703) in the borehole by filling the borehole with concrete. This not only fixes the position of the instrument in one location, but it couples the instrument to the substrata. Coupling enables the instrument to perceive seismic waves traveling through the strata because the instrument is actually attached to the strata. The next step in the method is to generate (704) a first set of seismic waves. These waves are reflected in the strata and are received (705) by the instrument. This data is recorded (706) so that mineral producers will have knowledge of reservoir conditions at that point in time. Later, a second set of seismic waves are generated (707). These waves again are reflected in the strata and are received (708) by the instrument. This second set of data is also recorded (709) for comparison with the first set of data.

In this method, the seismic source may also be placed in a borehole adjacent to the borehole for the receiver instruments. This allows the seismic wave to travel from the seismic source, down into the lower strata, be reflected back up toward the surface, and be received by the receiver instruments without travelling through an S-wave killing, soft earth, surface layer.

Figure 8:
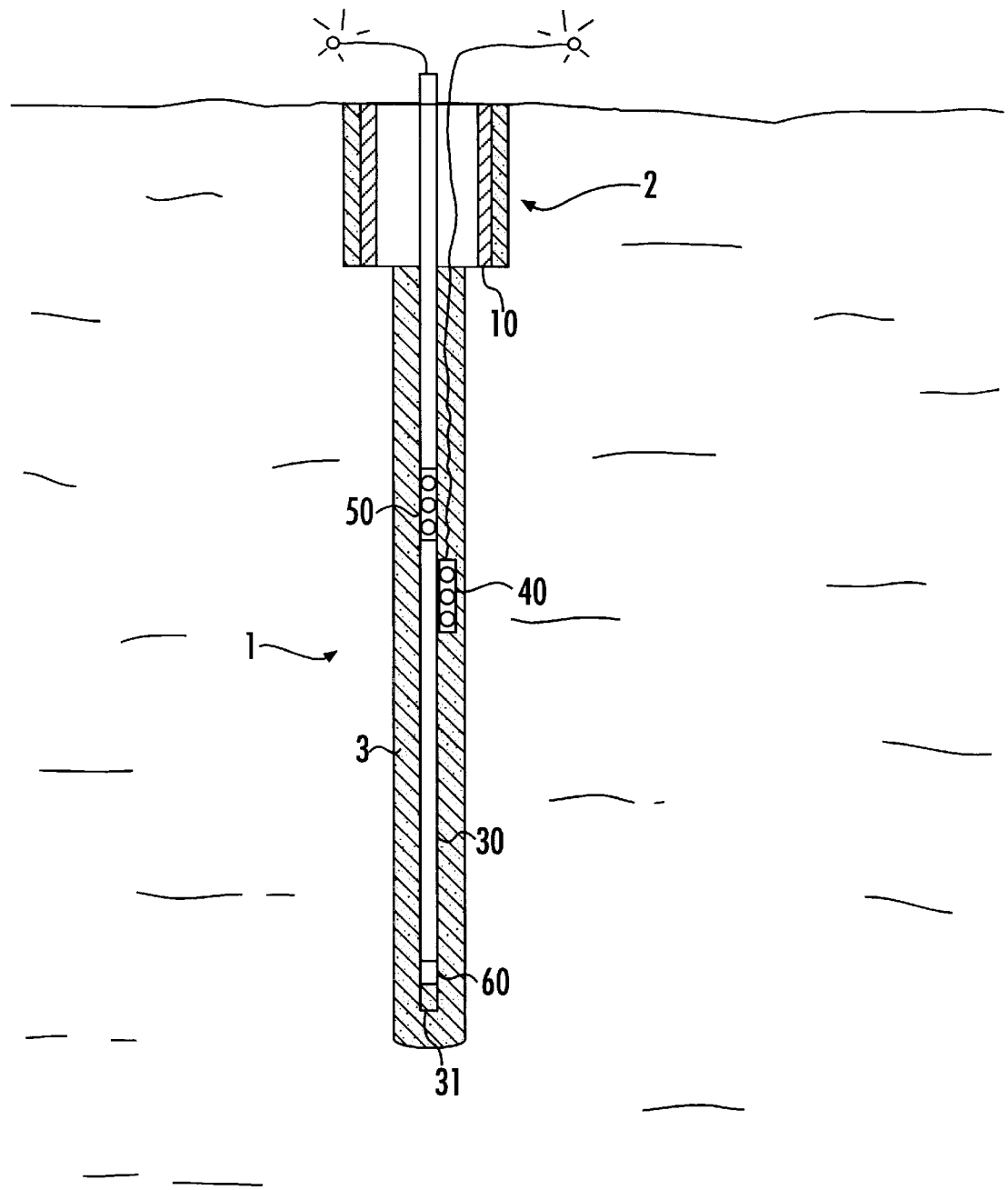
FIG. 8 is a diagram of a configuration of the invention with an instrument attached to an exterior of the pipe and an instrument attached to an interior of the pipe.

Referring to FIG. 8, there is shown a configuration of the instruments placed within the borehole. In this embodiment an instrument (40) is attached to the exterior of the pipe (30). The pipe (30) is inserted into the borehole so that the instrument (40) is about half way down the borehole. The pipe (30) is permanently fixed in the borehole by pumping concrete down the center of the pipe (30) so that the concrete comes out a hole (31) in the bottom of the pipe (30). The concrete then rises in the borehole (3) between the pipe (30) and the borehole walls so that it surrounds the instrument (40). A plug (60) is then used to push the concrete down the pipe so that interior of the pipe above the plug (60) is not filled with concrete. A second instrument (50) is then placed down in the interior of the pipe for readings. This instrument (50) may be retrieved and reinserted each time readings are desired.

A similar embodiment of the invention is to install the pipe without attaching an instrument (40) to the outside of the pipe (30). The cement is still removed from the interior of the pipe (30) by the plug (60). In this embodiment, no instruments are permanently fixed in the borehole. Rather, instruments are lowered into the pipe for taking readings. Once the readings are taken, the instruments are removed for use at other locations. Each time readings need to be taken, the instruments are simply lowered again into the pipe.

Figure 9:
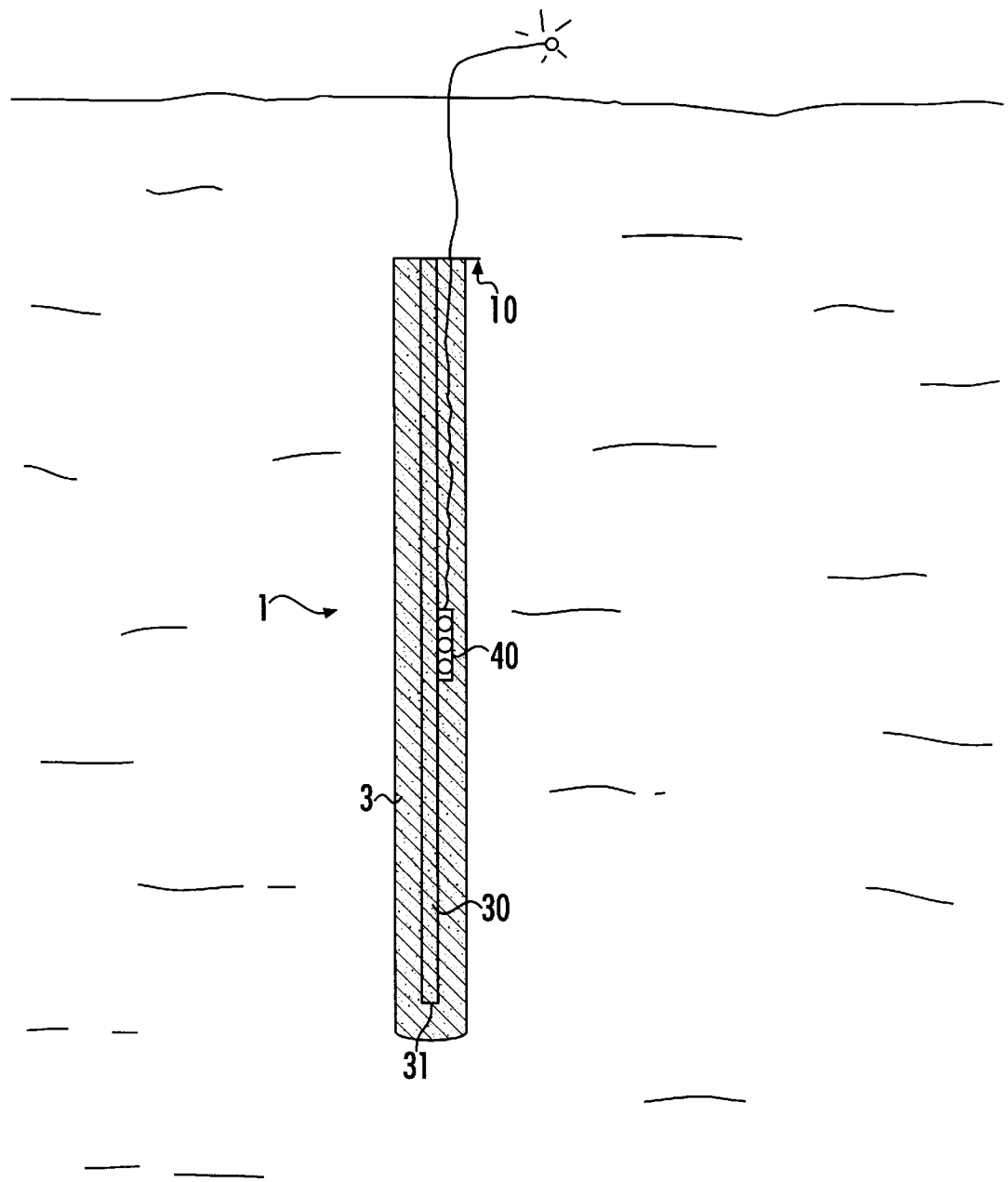
FIG. 9 is a diagram of a configuration of the invention with an upper section of the pipe removed.

Referring to FIG. 9, there is shown a diagram of a configuration for installing the instruments below the soft earth surface layer. In this configuration, the instrument (40) is attached to the exterior of the pipe (30) and the space between the pipe (30) and the borehole walls is filled with concrete as well as the inside of the pipe (30). Particular to this embodiment is the detachment of the upper portion of the pipe (30). The pipe (30) and borehole (3) are covered over with earth. This keeps the top of the pipe (30) from acting like an antenna by insulating the instrument from vibrations generated at and above the surface of the earth. These vibrations tend to interfere with the seismic reading being obtained by the instruments.

It is to be noted that the above described embodiments illustrate only typical embodiments of the invention and are therefore not to be considered a limitation of the scope of the invention which includes other equally effective embodiments.

I claim:

1. A system for collecting seismic information, the system comprising:

a signal source;

a signal receiver permanently fixed in a borehole and offset from said signal source;

said borehole being bottomed out beneath a soft earth surface layer and above a geologic formation of interest;

a control unit that sends and receives information to and from said signal source and said signal receiver; and communicators of data between said control unit and said signal receiver and said signal source;

wherein said signal receiver comprises:

a geophone component which operates in an X-direction;

a geophone component which operates in a Y-direction;

a geophone component which operates in a Z-direction; and a housing for said geophone components.

2. A system as in claim 1, wherein said housing is sealed.

3. A system as in claim 2, wherein said housing is sealed with epoxy.

4. A system as in claim 2, wherein said housing is sealed with glass.

5. A system as in claim 1, wherein said communicator is a cable that extends from said housing to the surface of the earth.

6. A system as in claim 1, wherein said communicator is a transmitter of information to the surface of the earth.

7. A system as in claim 1, wherein said communicator is sealed.

* * * * *

UNITED STATES PATENT AND TRADEMARK OFFICE
CERTIFICATE OF CORRECTION

PATENT NO : 5,979,588
DATED : Nov. 9, 1999
INVENTOR(S) : Sven Havig

It is certified that error appears in the above-identified patent and that said Letters Patent is hereby corrected as shown below:

In Column 5, Line 24, after "housing," "(405)" should read "(406)".

In Column 5, Lines 26, after "housing," "(405)" should read "(406)".

In Column 5, Lines 28, after "housing," "(405)" should read "(406)".

Signed and Sealed this

First Day of August, 2000

Q. TODD DICKINSON

Attest:

Attesting Officer

Director of Patents and Trademarks